Figure 2:
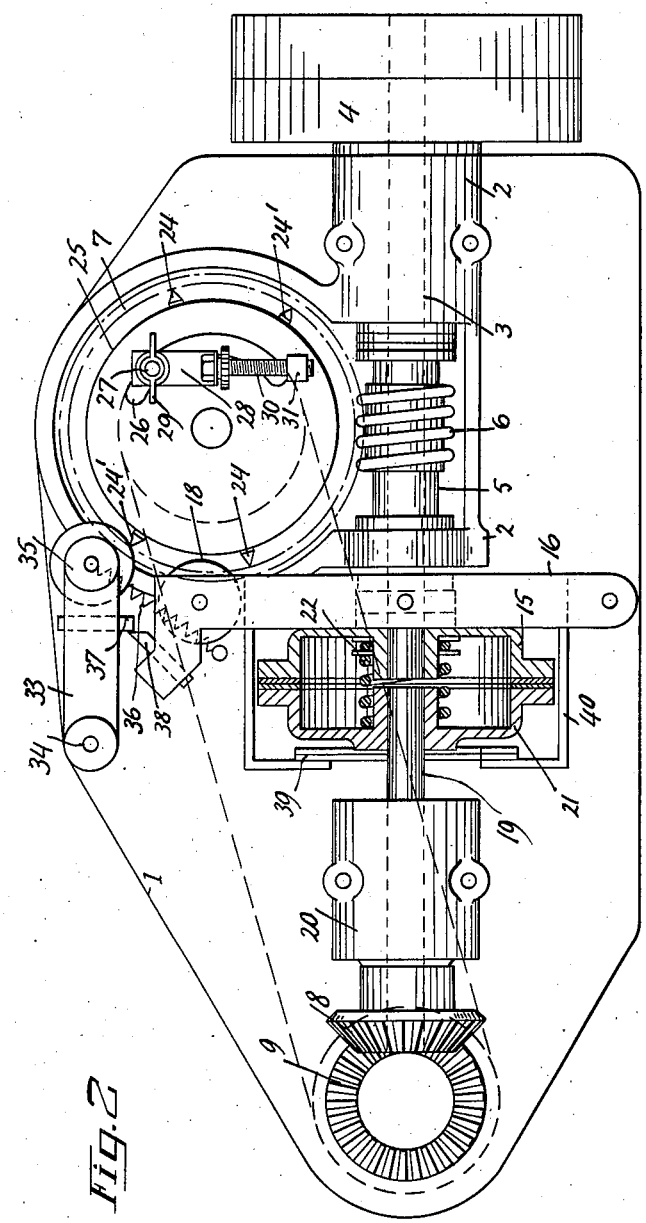

Jan. 7, 1941.  G. ROGERS  2,227,890
AUTOMATICALLY OPERATING CLUTCH MECHANISM
Filed Dec. 24, 1938  2 Sheets-Sheet 1
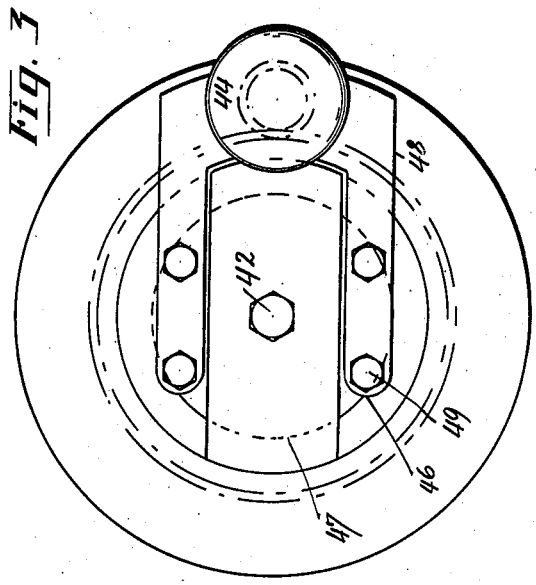
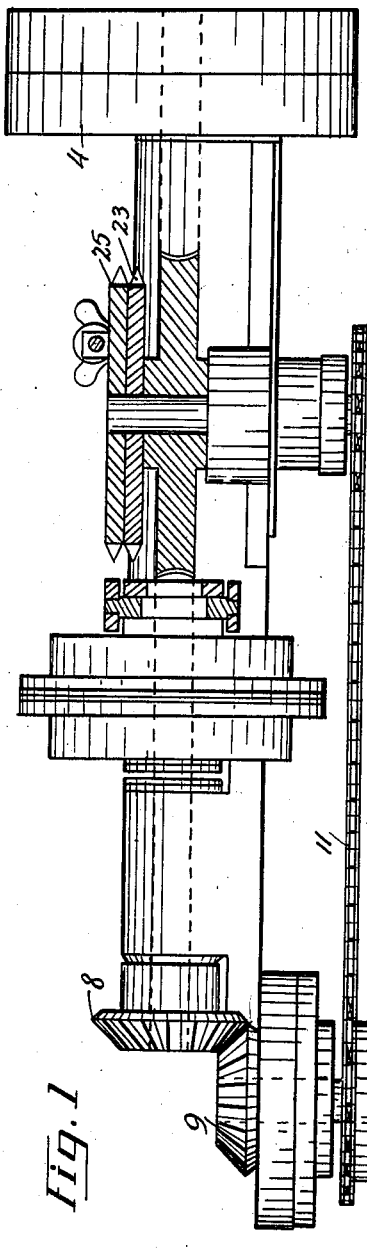
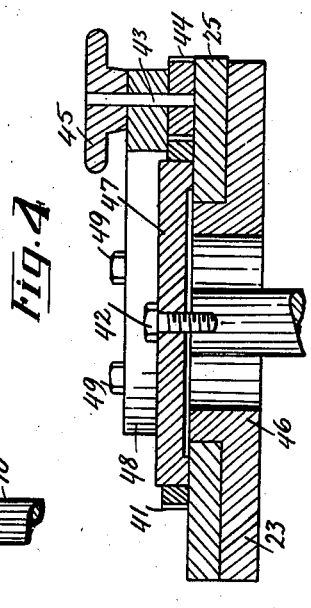
Inventor:
George Rogers Jan. 7, 1941.  G. ROGERS  2,227,890
AUTOMATICALLY OPERATING CLUTCH MECHANISM
Filed Dec. 24, 1938  2 Sheets-Sheet 2

Inventor:
George Rogers

Patented Jan. 7, 1941

2,227,890

UNITED STATES PATENT OFFICE 2,227,890

AUTOMATICALLY OPERATING CLUTCH MECHANISM

George Rogers, London, England

Application December 24, 1938, Serial No. 247,728
In Great Britain August 22, 1938

5 Claims. (Cl. 74—125.5)

This invention relates to automatically operating clutch mechanisms intended for application to machines for filling powdered or granular material, switches, signs, quick make-and-break switches, and other stopping and starting mechanisms of any kind or type and has for its object to provide improvements therein.

According to the present invention I provide a mechanism of the kind referred to comprising a driving spindle, a driven spindle, clutch means for coupling said spindles, rotary clutch control means in permanent driving engagement with the driving spindle for intermittent, alternate actuation of clutch operating means and release means for such clutch operating means, provision being made for the adjustment of the clutch control means so as to vary the period elapsing between the actuation of said clutch operating means and the release thereof.

These and other features of the invention will be clear from the following description, reference being had to the accompanying drawings depicting diagrammatically and by way of example a constructional form of a clutch mechanism constructed according to the invention and applied to a machine for filling powdered or granular material, and in which drawings:

Figure 1 shows a fragmentary sectional side elevation; Fig. 2 shows a fragmentary sectional plan view corresponding thereto; and Figs. 3 and 4 show a modified detail in fragmentary sectional side elevation and plan respectively.

A frame 1 carries in suitable bearings 2 a driving spindle 3 secured to and in permanent driving engagement with a pulley 4 driven by a belt from an electric motor or other source of power, not shown. A sleeve 5 with a worm 6 is permanently mounted on or formed integral with said driving spindle 3 and meshes with a worm wheel 7 driving the clutch control means hereinafter referred to in detail.

A movable clutch disc 15 is keyed for axial movement only on the driving spindle 3 and is under the control of a clutch operating lever 16 with a fulcrum 17 at one end and a roller 18 near the other end.

A driven spindle 19 is mounted in bearings 20 in axial alignment with the driving spindle and carries, adjacent to the movable clutch disc 15, a stationary clutch disc 21, a compression spring 22 being lodged between these two clutch discs and tending to push the movable clutch disc away from the stationary disc. The driven spindle 19 carries at its other end a bevel wheel 8 gearing with a second bevel wheel 9 mounted on the upper extremity of a filling spindle 10 concentrically disposed in a hopper, not shown, of the kind usually provided in filling machines for powdered or granular material.

A chain drive 11 taken from the worm wheel 7 rotates, independently of the filling spindle 10, a bush 12 or the like suitably rotatably mounted on a support 13 and carrying an agitator arm 14 for the powdered or granular material in the hopper.

The clutch control means hereinbefore referred to consist of a first cam disc, or the like 23 mounted on the worm wheel 7 and carrying two or more cam surfaces, pins or other projecting parts 24 disposed equidistant from each other on the periphery of the cam disc, level, and, in disengaged position of the clutch discs, adapted to engage, with the roller 18 on the lever 16. A second cam disc 25 provided with the same number of cam surfaces 24' as the first disc 23 is concentrically disposed on top of the first disc and adapted to be adjusted relatively thereto and secured in such position of adjustment.

The adjusting means for the two cam discs 23, 25, may, for example, consist of a pin 27 carried preferably by the first disc and passing through an arcuate slot 26 in the second disc and caused to move along such slot by appropriate vernier or other means. In Fig. 2 a form of vernier means is shown which consists of an L-shaped bracket 28 with a hole in each of its limbs. The pin 27 is passed through the hole in the longer horizontal limb of the two and held therein by a wing nut 29. A screw bolt 30 is passed through the other hole in the vertical limb of the bracket 28 so that its nut bears against said limb, the other end of the screw bolts screwing in an internally threaded block or the like 31 carried by the second disc.

The relative positions of the cam discs are adjusted by loosening the wing nut 29, rotating the screw bolt 30 preferably by means of a disc 32 mounted thereon and thus moving the pin 27 and the cam disc associated therewith along the arcuate slot according to the direction of rotation of the screw bolt either towards or away from the block 31.

In a modified form of the adjusting means for the cam disc shown in Figs. 3 and 4, the second disc 25 carries a large annular gear wheel 41 and is seated on the first cam disc 23 flanged as at 46. These cam discs are held together by a clamping plate 47 and a screw bolt 42 in connection with a worm wheel 7. A pin 43 is carried loosely by a substantially U-shaped member 48 secured by screw bolts 49 to the first disc. A small gear wheel 44 and a handle 45 for rotating it are mounted on said pin 43 such that on loosening the screw bolt 42 the second disc may be adjusted relatively to the first disc by rotation of the handle 45. Graduations may be suitably provided so that the amplitude of adjustment can be accurately determined.

A rotary catch lever 33 fulcrumed about 34 is suitably mounted in the neighbourhood of the second cam disc and clutch operating lever 16. This catch lever 33 carries a roller 35 disposed level with the second cam disc and is influenced by a traction spring 36 pulling it against said second cam disc. The catch lever 33 also carries a projection 37 adapted to co-act with another suitably shaped projection 38 on the roller carrying end of the lever 16 as will be readily understood from the following description of the operation of the clutch control means.

In the position of the mechanism shown in Figs. 1 and 2 the clutch discs are in engagement, the projection 38 is engaged behind one projection 37 and the cam surface 24 on the first cam disc has rotated beyond the roller 18 in the direction of the arrow subsequent to having actuated the latter and brought the parts associated therewith into one position shown. On further rotation, the cam surface 24' on the second cam disc comes against the roller 35 and pushes the catch lever 33 away from the cam disc against the action of the spring 36, thus releasing the projection 38 from the projection 37. The movable clutch disc is consequentially disengaged from the stationary clutch disc under the action of the spring 22 and the spindle 19 ceases to be driven.

Thus it will be seen that during one complete rotation of the cam discs the clutch is engaged and disengaged a number of times corresponding to the cam surfaces on either of the discs and that by adjusting the relationship between the corresponding cam surfaces on the two cam discs the period elapsing between the engagement and disengagement, and consequentially the quantity of granular material discharged on each occasion, can be varied to suit any particular needs.

In using these clutch means it has been found that on releasing the clutch discs and thus stopping the filling spindle the stationary clutch disc, owing to the rotary momentum imparted to it, continued to rotate or spin for a short period of time after the actual disengagement of the clutch has been effected thus impairing the accuracy of the amount of granular material discharged. To overcome this objection frictional means are provided to arrest the stationary clutch disc immediately after disengagement of the clutch.

In the preferred form of these frictional means shown, a frictional surface or surfaces 39 is or are mounted by a bracket or brackets 40 adjacent to the stationary clutch disc such that on disengagement of the clutch, when the movable clutch disc and its associated parts are moved away from the stationary disc, these frictional means engage with and arrest the stationary clutch disc.

I claim:

1. An automatically operating clutch mechanism comprising in combination a driving spindle, a driven spindle, clutch means for coupling said spindles, a clutch operating means for shifting the clutch from engaged to disengaged position and vice versa, a catch for holding said operating means in one of its positions, a release means for said catch, and rotary control means for the clutch operating means and the release means in permanent driving engagement with the driving spindle, said control means comprising a first and second cam disc arranged concentrically one upon the other, projecting cam surfaces disposed equidistant from each other and in equal number on each of said cam discs, said surfaces on one of said cam discs actuating the clutch operating means and the cam surfaces on the other cam disc operating the release means for said catch.

2. A structure as recited in claim 1, in combination with means for varying the relative positions of the two cam discs to thereby vary the relative positions of the cam surfaces thereon.

3. A structure as recited in claim 1 whereby said cam discs are secured together by a pin and slot connection, means for effecting movement of one of said discs with respect to the other by vernier means, and means for binding said discs together after adjustment.

4. A structure as recited in claim 1 wherein the clutch operating means comprises a lever pivoted at one end, and carrying a roller at its opposite end with which the cam surfaces of one of said discs engage.

5. A structure as recited in claim 1 wherein the clutch operating means comprises a lever pivoted at one end, and carrying a roller at its opposite end with which the cam surfaces of one of said discs engage, and wherein the release means comprises a pivoted lever provided with a roller with which the cam surfaces of the other of said discs engage said levers carrying interengaging projections which constitute the said catch and which catch is released when the roller of the release means is engaged by the cam of its corresponding cam disc.

GEORGE ROGERS.